(12) United States Patent
Korcusko

(10) Patent No.: US 11,787,646 B2
(45) Date of Patent: Oct. 17, 2023

(54) METHOD AND SYSTEM FOR COIL STACKING

(71) Applicant: K&S MACHINERY CORP., Linden, NJ (US)

(72) Inventor: Peter J. Korcusko, Linden, NJ (US)

(73) Assignee: K&S MACHINERY CORP., Linden, NJ (US)

( * ) Notice: Subject to any disclaimer, the term of this patent is extended or adjusted under 35 U.S.C. 154(b) by 92 days.

(21) Appl. No.: 17/370,421

(22) Filed: Jul. 8, 2021

(65) Prior Publication Data

US 2022/0009730 A1 Jan. 13, 2022

Related U.S. Application Data

(60) Provisional application No. 63/049,231, filed on Jul. 8, 2020.

(51) Int. Cl.
| | |
|---|---|
| *B65G 61/00* | (2006.01) |
| *B25J 15/00* | (2006.01) |
| *B66F 3/24* | (2006.01) |
| *B65H 19/12* | (2006.01) |
| *B25J 19/00* | (2006.01) |
| *B65G 13/00* | (2006.01) |

(52) U.S. Cl.
CPC .......... *B65G 61/00* (2013.01); *B25J 15/0047* (2013.01); *B25J 19/0012* (2013.01); *B65H 19/123* (2013.01); *B66F 3/24* (2013.01); *B65G 13/00* (2013.01)

(58) Field of Classification Search
CPC . B25J 15/0047; B25J 19/0012; B65H 19/123; B65G 61/00; B65G 13/00; B66F 3/24; B66C 1/54; B66C 1/66; B66C 1/485; B66C 1/42; E21B 31/20
See application file for complete search history.

(56) References Cited

U.S. PATENT DOCUMENTS

| | | | | |
|---|---|---|---|---|
| 1,445,581 | A | * 2/1923 | Fullop | ..................... E21B 31/20 |
| | | | | 294/86.2 |
| 1,605,273 | A | * 11/1926 | Norton | ..................... B66C 1/54 |
| | | | | 294/93 |
| 6,119,974 | A | 9/2000 | Wente et al. | |
| 6,273,670 | B1 | * 8/2001 | Henson | ................ B65G 59/063 |
| | | | | 209/583 |

* cited by examiner

*Primary Examiner* — Gregory W Adams
(74) *Attorney, Agent, or Firm* — Calderone Bullock LLC

(57) ABSTRACT

A method and system for stacking coils in which a coil stacker lifting head can be used to raise one or more coils from a conveyor assembly. The coil stacker lifting head can be automatically actuated using a actuating cylinder and a counter balance cylinder. The coil stacker lifting head can include an expanding mandrel to grab opposite edges of the coil and lift the coil. One or more of the coils can be lifted from a conveyor assembly by the coil stacker lifting head. After the one or more coils are lifted, a carriage assembly can transport the lifted one or more coils to a desired position. Once the one or more coils reach the desired position, the one or more coils are lowered to a surface. Upon reaching the surface, the mandrel automatically collapses to release the one or more coils and the mandrel is released from the coils.

18 Claims, 5 Drawing Sheets

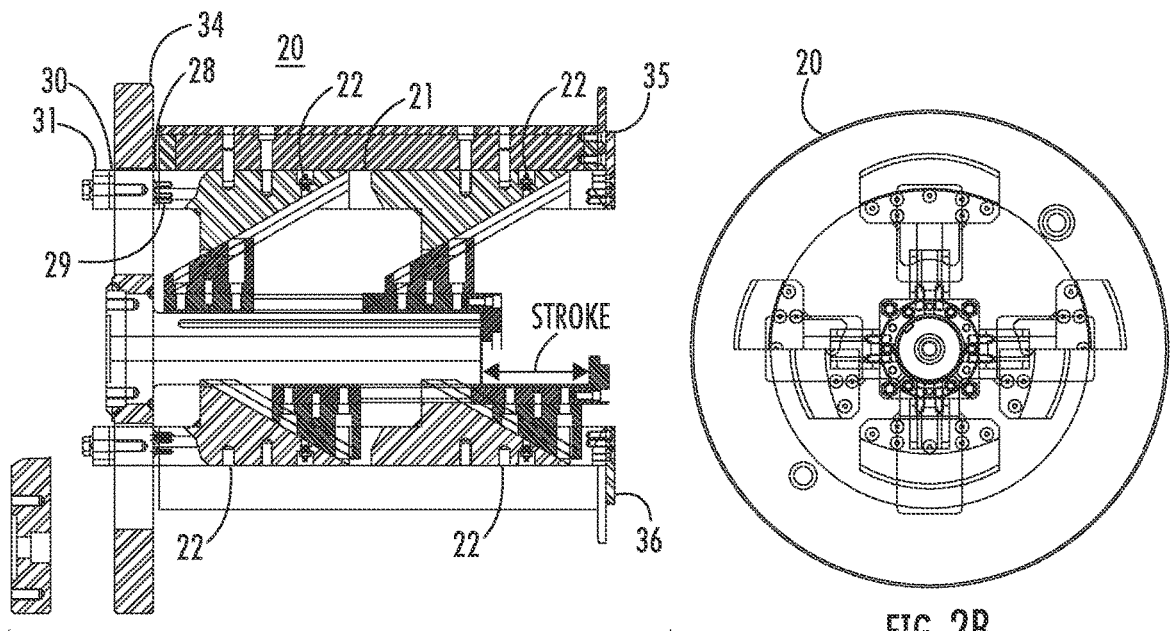
FIG. 2A
FIG. 2B
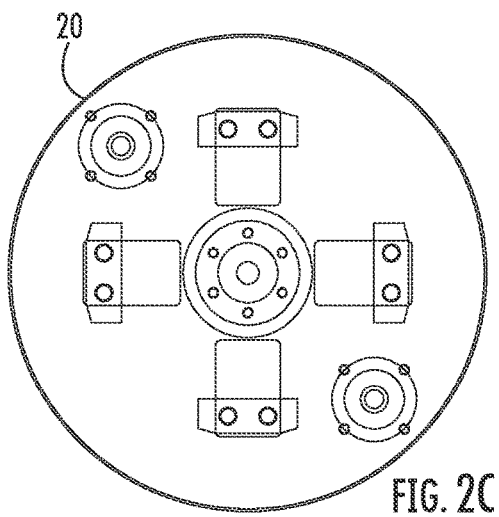
FIG. 2C
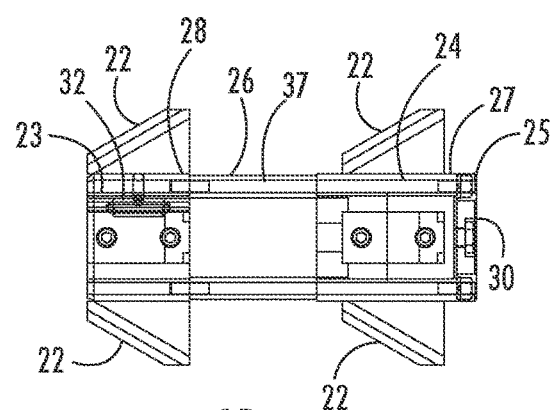
FIG. 2D
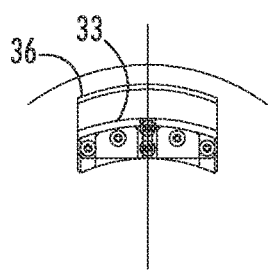
FIG. 2E
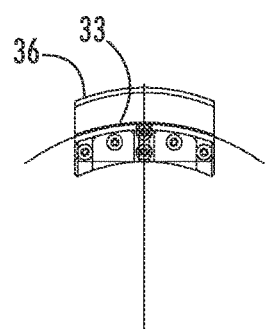
FIG. 2F

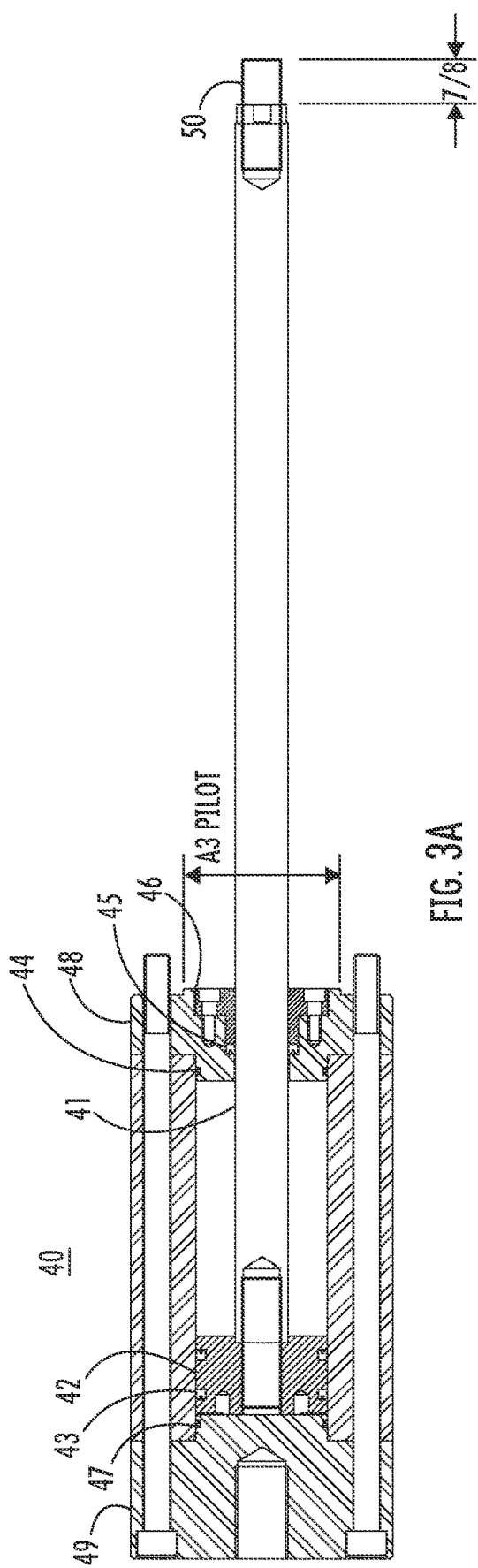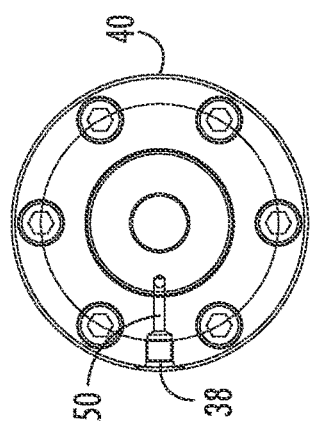

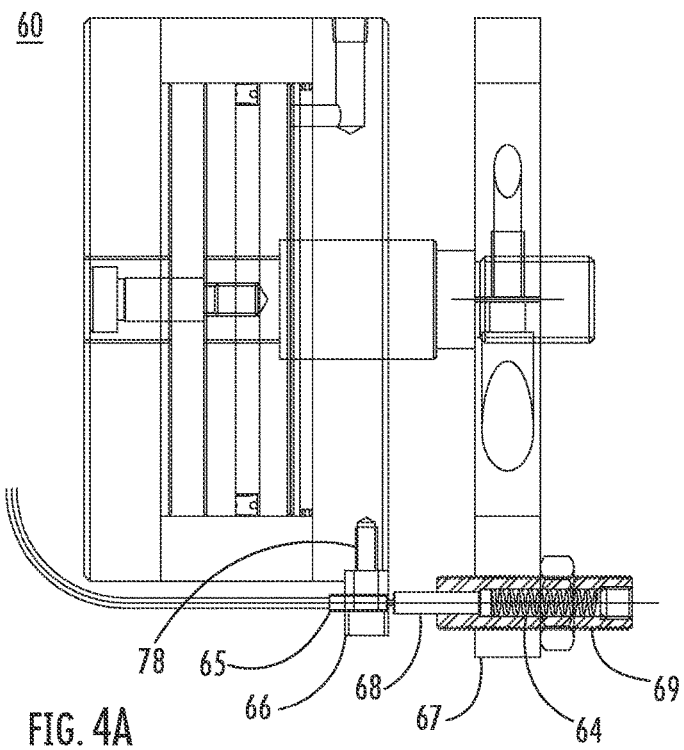
FIG. 4A
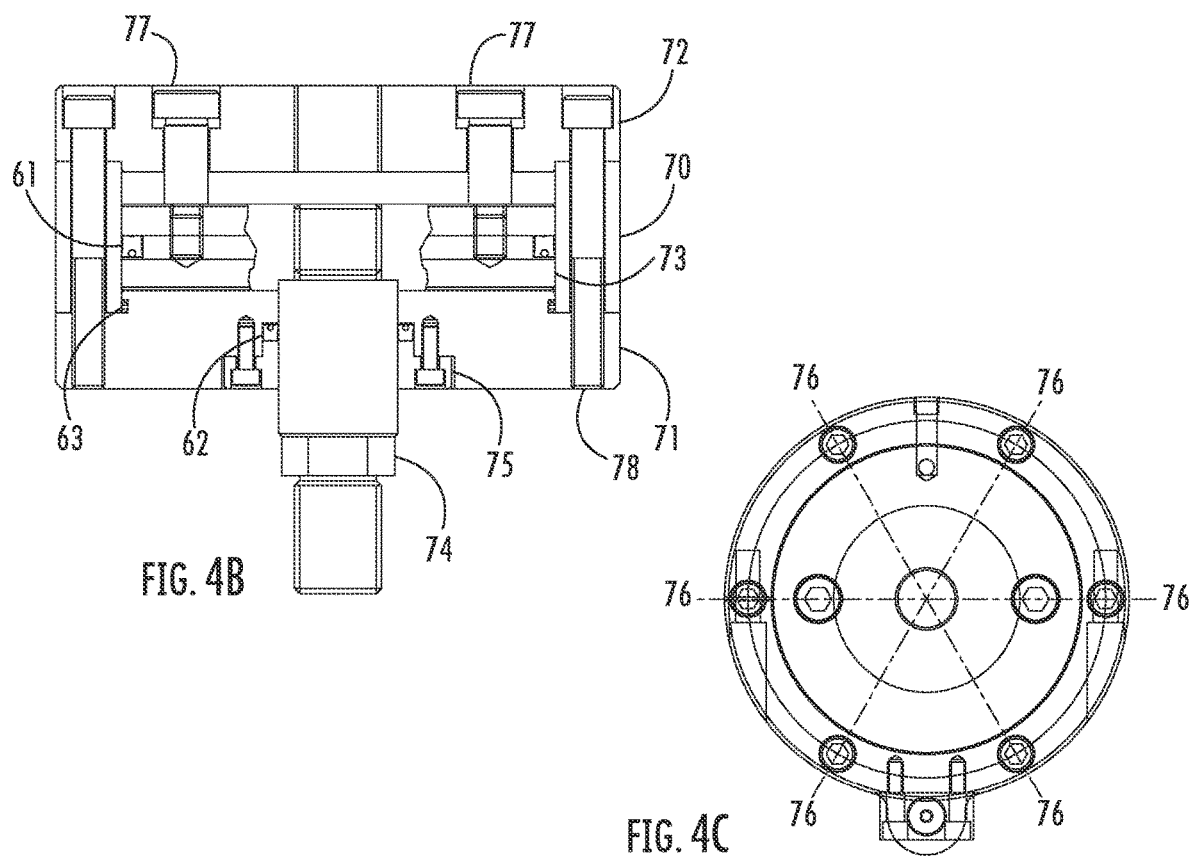
FIG. 4B
FIG. 4C

METHOD AND SYSTEM FOR COIL STACKING

BACKGROUND OF THE INVENTION

Field of the Invention

The present invention relates to a method and system for automatically stacking of coils on a conveyor system in which one or more coils can be stacked and transported from the conveyor system.

Description of Related Art

Metal slitting processing can be used for cutting a large roll of metal into multiple, narrower coils, referred to as mults. U.S. Pat. No. 6,119,974 describes an expandable annular core is provided for mounting on a conventional expandable mandrel of a coil slitting machine to achieve a greater inner diameter for the coil wound thereon. The inner diameter of the annular core is approximately equal to the outer diameter of the expandable mandrel, and the outer diameter of the core is equal to the desired inner diameter of the coils. A plurality of cores are placed in series on the mandrel, each core being adapted to receive a strand of slit metal on it's outer surface. The cores are capable of expanding and contracting with the mandrel to facilitate removal of the coils from the recoiler. To effect this expansion and contraction, the annular core has a radial slot or joint, preferably with opposing ends of at tongue and groove-shaped configuration.

It is desirable to provide an improved expanding mandrel for to grab opposite edges of the coil and lift the coil which can be used with a conveyor system to transport one or more of the coils from a production line to a pallet. It is desirable to provide a method and system for automatically stacking one or more coils.

SUMMARY OF THE INVENTION

The present invention relates a method and system for stacking coils in which a coil stacker lifting head can be used to raise one or more coils from a conveyor assembly. The coil stacker lifting head can be automatically actuated using a actuating cylinder and a counter balance cylinder. The coil stacker lifting head can include an expanding mandrel to grab opposite edges of the coil and lift the coil. One or more of the coils can be lifted from a conveyor assembly by the coil stacker lifting head.

After the one or more coils are lifted, a carriage assembly can transport the lifted one or more coils to a desired position. Once the one or more coils reach the desired position, the one or more coils are lowered to a surface. Upon reaching the surface, the mandrel automatically collapses to release the one or more coils and the mandrel is released from the coils.

The mandrel can include four sections of wedges to expand within the coil to contact an inner surface of the coil thereby eliminating the weight of the coil. The mandrel can also include a pair of opposed lifter feet to automatically extend underneath the coil once the mandrel is in an expanded position.

The invention will be more fully described by reference to the following drawings.

BRIEF DESCRIPTION OF THE DRAWINGS

FIG. 2A is a schematic diagram of a coil stacker lifting head used in the system for coil stacking.
FIG. 2B is a top view of the coil stacker lifting head.
FIG. 2C is a bottom view of the coil stacker lifting head.
FIG. 2D is a schematic diagram of a body assembly used in the coil stacker lifting head.
FIG. 2E is a schematic diagram of a drum filler of the coil stacker lifting head in a collapsed position.
FIG. 2F is a schematic diagram of the drum filler of the coil stacker lifting head in an expanded position.
FIG. 3A is a schematic diagram of an actuating cylinder used in the system for coil stacking.
FIG. 3B is an end view of the actuating cylinder.
FIG. 4A is a schematic diagram of a counterbalance cylinder used in the system for coil stacking.
FIG. 4B is a schematic diagram of a body of the counterbalance cylinder.
FIG. 4C is an end view of the counter balance cylinder.

DETAILED DESCRIPTION

Figure 1B:
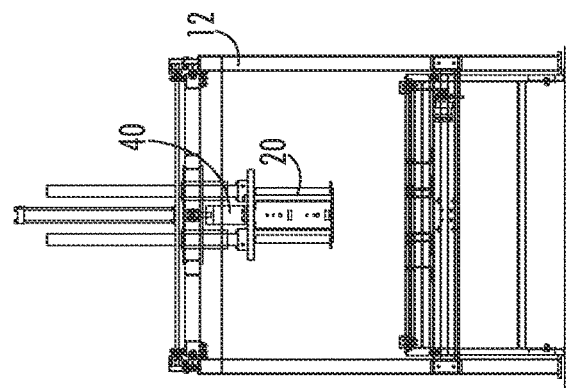
FIG. 1B is an end view of the system shown in FIG. 1A.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1C:
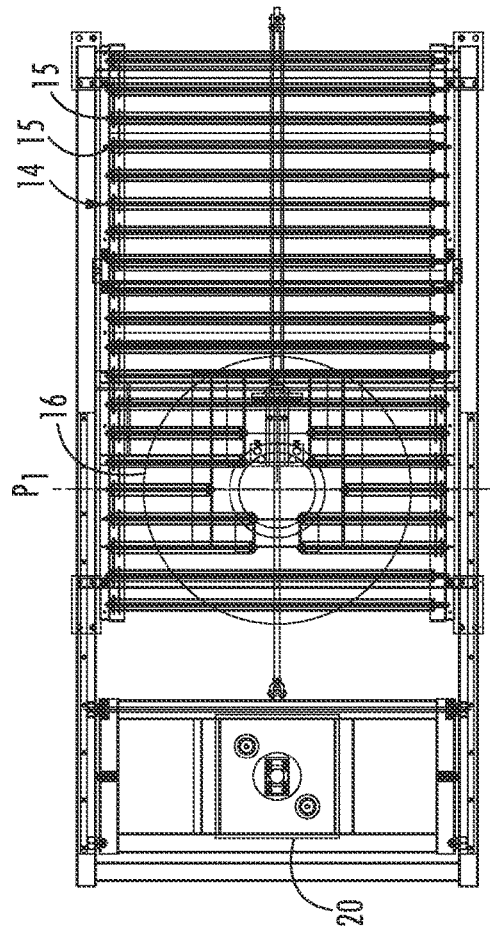
FIG. 1C is a top view of the system shown in FIG. 1A.
Figure 1A:
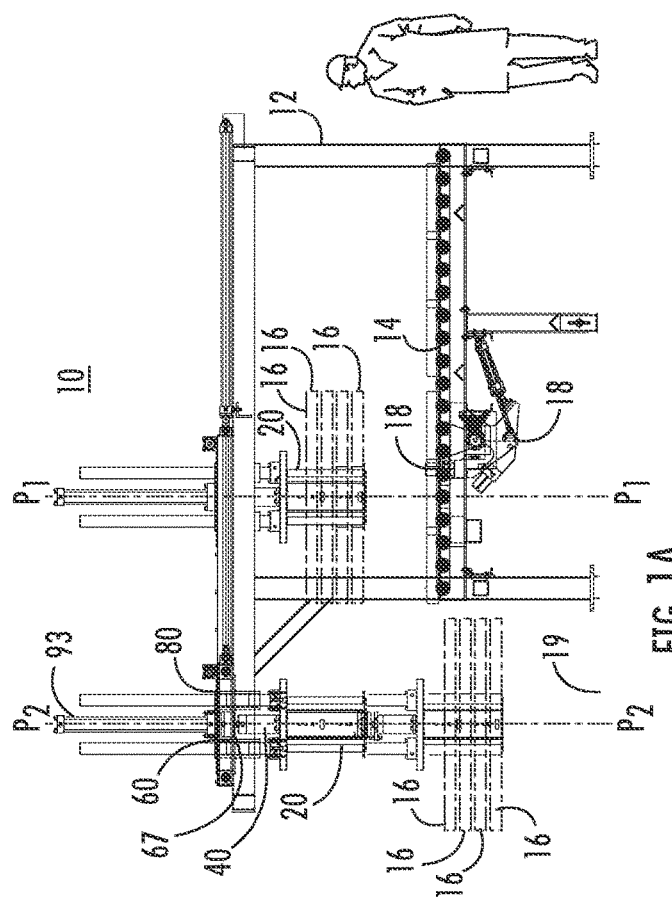
FIG. 1A is a schematic diagram a system for coil stacking.

FIGS. 1A and 1B illustrate system for coil stacking 10. Conveyor assembly 14 is coupled to stacker frame 12. One or more coils 16 are individually conveyed by conveyor assembly 14 to coil centering assembly 18. An example coil 16 can be formed of metal and have a diameter of about 28 inches. At coil centering assembly 18, each coil 16 is centered beneath coil stacker lifting head 20 and each of the one or more coils 16 are taken one by one to be stacked with coil stacker lifting head 20. Coil stacker lifting head 20 can be automatically actuated using a actuating cylinder 40 and a counter balance cylinder 60 for lifting one more coils 16 from conveyor assembly 14 at position P1.

After one or more coils 16 are lifted by coil stacking lifting head 20, carriage assembly 80 can transport the lifted one or more coils 16 to position P2. Once the one or more coils 16 reach position P2, the one or more coils 16 are lowered to surface 19 and coil stacker lifting head 20 automatically releases the one or more coils 16. Conveyor assembly 14 can include one or more conveyor rollers 15 as shown in FIG. 1C.

An embodiment of coil stacker lifting head 20 is shown in FIGS. 2A-2C. Drum wedges 22 form an expanding mandrel. A pair of opposed drum wedges 22 expand laterally within a received coil 16 to each contact an opposed inner surface of coil 16 during lifting of coil 16. The pair of opposed drum wedges 22 contract within received coil 16 to release coil 16. Drum wedges 22 in combination form an expandable drum. Rear bushing 23 is secured in rear body 28. Front bushing 24 is secured in front body 27. Front cap 25 is positioned at an end of front body 27. Spacer tube 26 extends between rear body 28 and front body 27. A set of four drum wedges 22 are positioned at front body 27 and a set of four drum wedges 22 are positioned at rear body 28. Wear plates 29, 30 and 31 are positioned adjacent flanged arbor 34. Key 32 slides in keyway in flanged arbor 34 to prevent rotation of the entire body on flanged arbor 34 as shown in FIGS. 2A and 2D. Four threaded studs 37 connect rear body 28, spacer tube 26 and front body 27. Locknut 38 is connected to thread 50 on actuating cylinder as shown in FIG. 3A.

Lifter feet 35, 36 extend from drum segment 21 and drum fillers 33 as shown in FIG. 2A. In a collapsed position, lifter foot 36 is collapsed from drum filler 33 as shown in FIG. 2E. In an expanded position, lifter foot 36 from drum filler 33 is expanded as shown in FIG. 2F. Opposed lifter feet 35,36 extend underneath the coil when drum wedges 22 are in an expanded position.

An embodiment of actuating cylinder 40 is shown in FIGS. 3A-3B. Actuating cylinder 40 is a hydraulic cylinder. Actuating cylinder 40 can include cylinder rod 41 which is locked into piston 42 with piston seal 43. Cylinder rod 41 moves within O-ring 44 sealed with rod seal 45 to rod gland 46. O-ring 47 is positioned in rear cap 49. Piston 42 can raise and lower cylinder rod 41. Front cap 48 is positioned at the front of actuating cylinder 40. Rear cap 49 is positioned at a rear of actuating cylinder 40. Thread 50 is connected at an end of cylinder rod 41. Actuating cylinder 40 can be used for hydraulically vertically raising and lowering coil stacker lifting head 20 as shown in FIG. 1.

Figure 5C:
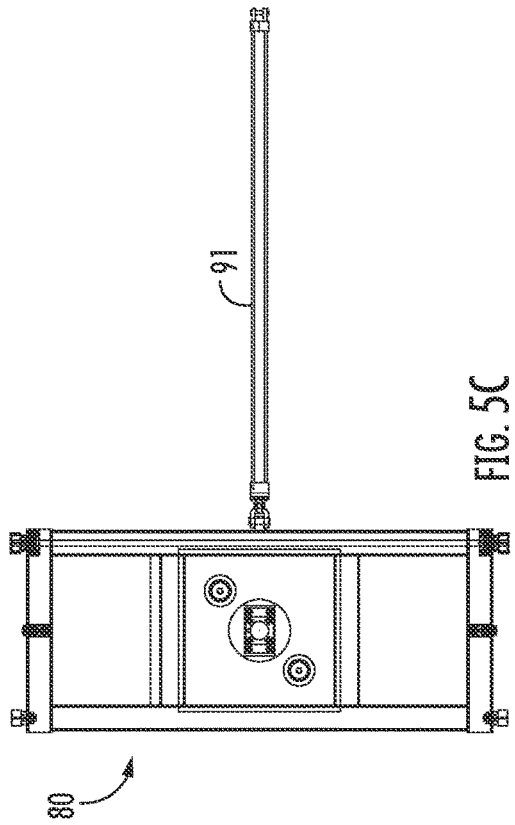
FIG. 5C is a schematic diagram of the carriage traverse cylinder.
Figure 5D:
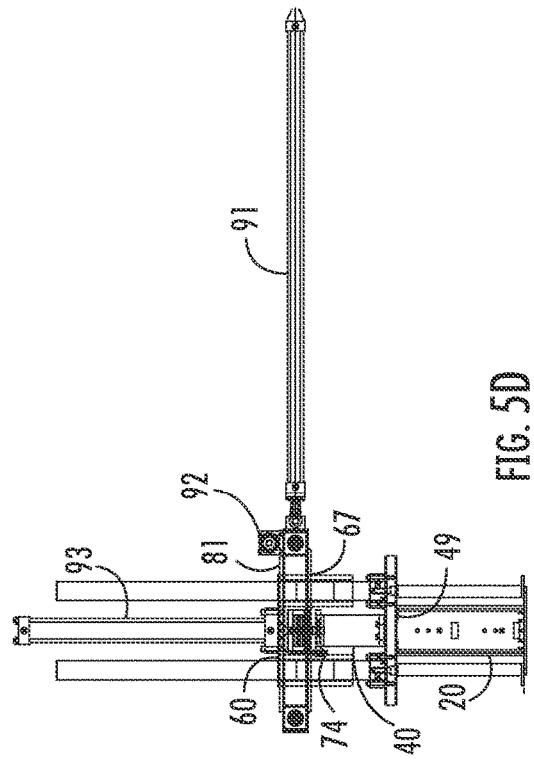
FIG. 5D is a schematic diagram of the carriage traverse cylinder.
Figure 5A:
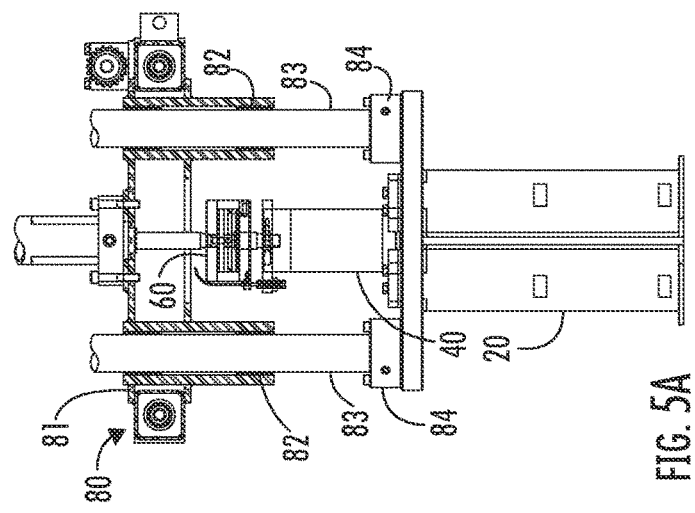
FIG. 5A is a schematic diagram of a carriage assembly used in the system for coil stacking.

An embodiment of counterbalance cylinder 60 is shown in FIGS. 4A-4B. Counterbalance cylinder 60 is a pneumatic cylinder. Counterbalance cylinder 60 includes cylinder tube 70, front cap 71 and rear cap 72 assembled by six socket cap screws 76. Front cap 71 is sealed in cylinder tube 70 by O ring 63. Piston 73 is assembled between front cap 71 and rear cap 72. Piston 73 is sealed inside cylinder tube 70 by piston seal 61. Piston 73 is prevented from rotating inside cylinder tube 70 by shoulder screws 77. Cylinder rod 74 is threaded into piston 73 and sealed in front cap 71 by rod seal 62. Rod seal 62 is held in front cap 71 by rod gland 75 which is attached to front cap 71 by socket cap screws 78. Limit switch 65 is mounted in switch mounting block 66 and fixed to the side of counterbalance cylinder 60 by two socket cap screws 78. Plunger 68, plunger housing 69 and spring 64 are mounted in plunger mounting ring 67. Plunger mounting ring 67 is clamped onto actuating cylinder 40 as shown in FIG. 5A. Counterbalance cylinder 60 is mounted between the lift cylinder 93 and the actuation cylinder 40.

Figure 5B:
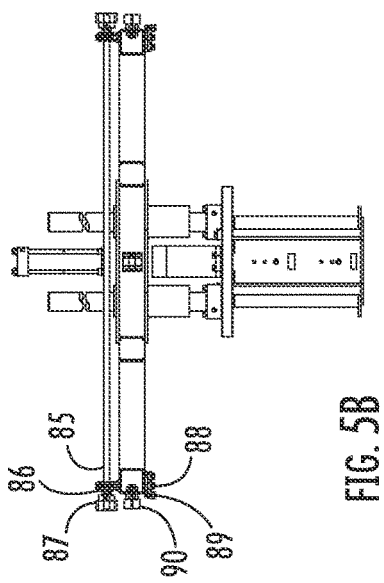
FIG. 5B is a schematic diagram of a base of the carriage assembly.

An embodiment of stacker carriage assembly 80 in combination with actuating cylinder 40 and counterbalance cylinder 60 is shown in FIGS. 5A-5B. Guide rods 83 slide within bushing 82. Guide rods 83 are coupled to collar 84. Collar 84 is coupled to coil stacker lifting head 20. Gear shaft 85 is coupled with ball bearing 86 to spur gear 87. Cam follower 89 and 90 are coupled to mounting bar 88. Carriage traverse cylinder 91 is connected to carriage 81 and moves carriage assembly 80 from the coil lifting and stacking position to the coil or stack unloading position. Lifting cylinder 93 piston rod is threaded into rear cap 72 of counterbalance cylinder 60. Counterbalance cylinder rod 74 is threaded into rear cap 49 of actuating cylinder 40.

Numerous and varied other arrangements can be readily devised in accordance with these principles by those skilled in the art without departing from the spirit and scope of the invention.

I claim:

1. A system for stacking a plurality of coils comprising: a coil stacker lifting head; the coils stacker lifting head including an expanding mandrel, the expanding mandrel configured to expand to receive opposite edges of at least one of the plurality of coils and grab the at least one of the plurality of coils; and actuating means for automatically actuating the coil stacker lifting head to lift the plurality of coils wherein the expanding mandrel comprises a spacer tube extending between a rear body and a front body, a first set of drum wedges are positioned at the front body and a second set of drum wedges are positioned at the rear body, the first set of drum wedges and the second set of the drum wedges contact an opposed inner surface of the coil during lifting of the at least one coil and the first set of drum wedges and the second set of the drum wedges contract within received at least one coil to release the at least one coil.

2. The system of claim 1 further comprising a carriage assembly, the coil stacker lifting head being transported by the carriage assembly to transport the lifted at least one coil to a predetermined position over a surface, once the at least one coil reaches the desired position, the at least one coil is lowered to the surface by the coil stacker lifting head, upon reaching the surface, the expanding mandrel automatically collapses to release the at least one coil to place the at least one coil on the surface.

3. The system of claim 2 wherein the surface is a surface of a conveyor assembly.

4. The system of claim 2 wherein the conveyor assembly includes a plurality of conveyor rollers.

5. The system of claim 3 further comprising a stacking frame, the conveyor assembly and the coils stacker lifting head being coupled to the stacking frame.

6. The system of claim 1 wherein the expanding mandrel is an expandable drum comprises a pair of opposed drum wedges.

7. The system of claim 1 wherein said expanding mandrel further comprises a pair of opposed lifter feet, the lifter feet extend underneath the coil when the first set of drum wedges and the second set of drum wedges are in an expanded position.

8. The system of claim 1 wherein the actuating means comprises an actuating cylinder, including a cylinder rod and a piston, the piston raising and lowering the cylinder rod, wherein the actuating cylinder hydraulically vertically raising and lowering the coil stacker lifting head.

9. A system for stacking a plurality of coils comprising: a coil stacker lifting head; the coils stacker lifting head including an expanding mandrel, the expanding mandrel configured to expand to receive opposite edges of at least one of the plurality of coils and grab the at least one of the plurality of coils; actuating means for automatically actuating the coil stacker lifting head to lift the plurality of coils, the actuating cylinder, including a cylinder rod and a piston, the piston raising and lowering the cylinder rod, the actuating cylinder hydraulically vertically raising and lowering the coil stacker lifting head and a counterbalance cylinder mounted between the actuation cylinder and a lift cylinder, the lift cylinder lifting the coil stacker lifting head.

10. The system of claim 9 wherein the actuating cylinder is a hydraulic cylinder and the counterbalance cylinder is a pneumatic cylinder.

11. The system of claim 10 further comprising a carriage assembly, the stacker carriage assembly including a carriage traverse cylinder connected to a carriage, the carriage traverse cylinder moves the carriage assembly from a coil lifting and stacking position to a coil or stack unloading position.

12. The system of claim 11 further comprising guide rods which slide within a bushing, the guide rods are coupled to a collar, the collar is coupled to the coil stacker lifting head, a piston of the lifting cylinder is threaded into a rear cap of the counterbalance cylinder and a cylinder rod of the counterbalance cylinder is threaded into a rear cap of the actuating cylinder.

13. A method for stacking a plurality of coils comprising:
lifting one or more coils using a coil stacker lifting head;
the coil stacker lifting head including an expanding mandrel, the expanding mandrel configured to expand to receive opposite edges of at least one of the plurality of coils and grab the at least one of the plurality of coils wherein the expanding mandrel comprises a spacer tube extending between a rear body and a front body, a first set of drum wedges are positioned at the front body and a second set of drum wedges are positioned at the rear body, the first set of drum wedges and the second set of the drum wedges contact an opposed inner surface of the coil during lifting of the at least one coil and the first set of drum wedges and the second set of the drum wedges contract within received at least one coil to release the at least one coil.

14. The method of claim 13 further comprising the step of:
actuating the coil stacker lifting head to lift the plurality of coils.

15. The method of claim 14 further comprising the steps of:
transporting by a carriage assembly the lifted at least one coil to a predetermined position over a surface;
once the at least one coil reaches the desired position, lowering the at least one coil is to the surface by the coil stacker lifting head, upon reaching the surface, the expanding mandrel automatically collapses to release the at least one coil to place the at least one coil on the surface.

16. The method of claim 14 wherein the step of actuating is performed with an actuating cylinder, the actuating cylinder including a cylinder rod and a piston, the piston raising and lowering the cylinder rod, wherein the actuating cylinder hydraulically vertically raising and lowering the coil stacker lifting head.

17. A method for stacking a plurality of coils comprising:
lifting one or more coils using a coil stacker lifting head;
the coil stacker lifting head including an expanding mandrel, the expanding mandrel configured to expand to receive opposite edges of at least one of the plurality of coils and grab the at least one of the plurality of coils; and
actuating the coil stacker lifting head to lift the plurality of coils performed with an actuating cylinder, the actuating cylinder including a cylinder rod and a piston, the piston raising and lowering the cylinder rod, wherein the actuating cylinder hydraulically vertically raising and lowering the coil stacker lifting head and further comprising a counterbalance cylinder mounted between the actuation cylinder and a lift cylinder, the lift cylinder lifting the stacker lifting head.

18. A method for stacking a plurality of coils comprising:
lifting one or more coils using a coil stacker lifting head, the coil stacker lifting head including an expanding mandrel, the expanding mandrel configured to expand to receive opposite edges of at least one of the plurality of coils and grab the at least one of the plurality of coils; and
actuating the coil stacker lifting head to lift the plurality of coils performed with an actuating cylinder, the actuating cylinder including a cylinder rod and a piston, the piston raising and lowering the cylinder rod, wherein the actuating cylinder hydraulically vertically raising and lowering the coil stacker lifting head and further comprising guide rods which slide within a bushing, the guide rods are coupled to a collar, the collar is coupled to the coil stacker lifting head, a piston of the lifting cylinder is threaded into a rear cap of the counterbalance cylinder and a cylinder rod of the counterbalance cylinder is threaded into a rear cap of the actuating cylinder.

\* \* \* \* \*